United States Patent [19]
Correard

[11] Patent Number: 4,797,038
[45] Date of Patent: Jan. 10, 1989

[54] POWDER RECOVERY METHOD AND DEVICE

[75] Inventor: Jean-Yves Correard, Saint Martin d'Heres, France

[73] Assignee: SAMES S.A., Meylan, France

[21] Appl. No.: 898,382

[22] Filed: Aug. 20, 1986

[30] Foreign Application Priority Data

Aug. 22, 1985 [FR] France .................. 85 12613

[51] Int. Cl.$^4$ .................................. B65G 53/38
[52] U.S. Cl. ...................... 406/138; 406/173; 406/109
[58] Field of Search .......... 406/169, 138, 168, 171, 406/109, 173, 143, 197, 141, 142; 427/345

[56] References Cited

U.S. PATENT DOCUMENTS

| | | | |
|---|---|---|---|
| 2,972,501 | 2/1961 | Feinman | 406/141 X |
| 3,489,464 | 1/1970 | Delfs | 406/109 |
| 3,698,874 | 10/1972 | Zenz | 23/284 |
| 4,245,551 | 1/1981 | Berkmann | 98/115 |
| 4,530,290 | 7/1985 | Comparato | 406/138 X |
| 4,593,630 | 6/1986 | Teigen | 406/138 X |

FOREIGN PATENT DOCUMENTS

| | | | |
|---|---|---|---|
| 545532 | 8/1957 | Canada | 406/138 |
| 1130633 | 2/1957 | France . | |
| 1302617 | 7/1962 | France . | |
| 1381382 | 11/1964 | France | 406/138 |
| 707690 | 4/1954 | United Kingdom | 406/138 |
| 919030 | 2/1963 | United Kingdom | 406/138 |
| 1198129 | 7/1970 | United Kingdom . | |

Primary Examiner—Joseph F. Peters, Jr.
Assistant Examiner—James M. Kannofsky
Attorney, Agent, or Firm—Sandler & Greenblum

[57] ABSTRACT

A method of recovering powder, for example in a powder-coating installation, uses processing plant adapted to operate at a pressure different to atmospheric pressure. Powder accumulating in a receptacle communicating with the processing plant is fluidized and a pressure head of fluidized powder is created to compensate the pressure difference imposed by the processing plant. A corresponding powder recovery device comprises processing plant adapted to operate at a pressure different to atmospheric pressure, a receptacle for the powder, a substantially vertical column through which this receptacle communicates with the processing plant, and structure for fluidizing at least the powder in this column. The processing plant may comprise a cyclone type separator, in which case the column is a pipe extending the cyclone downwardly. Alternatively, the processing plant may comprise a box having an air inlet and an air outlet and filters between the air inlet and the air outlet. In this case the column comprises a pipe coupled to the bottom of a hopper situated beneath the filters.

21 Claims, 2 Drawing Sheets

POWDER RECOVERY METHOD AND DEVICE

BACKGROUND OF THE INVENTION

1. Field of the Invention

The invention concerns a method of recovering powder, in particular for recycling coating powders in powder-coating installations in which objects to be coated are sprayed with powder, preferably by means of an applied electrostatic charge, before they are subject to a heat treatment converting the powder into a homogeneous and strong covering.

The invention also concerns various embodiments of a device implementing this method and incorporating in particular means for processing the aspirated air-powder mixture, these known means being adapted to operate at a pressure different to atmospheric pressure.

2. Description of the Prior Art

A powder-coating installation, in particular of the electrostatic type, generally comprises a sort of cabin through which the objects to be coated are passed in order to be sprayed with powder. Once covered with a relatively uniform but non-adherent layer, the objects are passed into an oven where the powder is converted into a homogeneous and extremely strong covering. Thus powder-coating processes have certain advantages over paint spraying processes, on the one hand because no solvent evaporates in the vicinity of the installation and on the other hand because the powder which is not deposited on the objects may be recovered and recycled. To do this air is sucked out of the cabin and a known type of aerodynamic separator is used to separate the powder from the air and thus to clean the air. A known type separator device is the "cyclone" which comprises an enclosure with a cylindrical and/or fustoconical wall into which air laden with powder is fed tangentially to create a whirlwind type effect as a result of which, because of the centrifugal force generated, the powder is thrown towards the wall of the enclosure and subsequently recovered therefrom; the cleaned air is taken off through an axial conduit. Other types of separator device may be used.

The effective recovery of the powder, which generally collects in a storage tank at the outlet from this type of separator, raises a problem when the separator is adapted to function at a pressure different to, generally slightly lower than, atmospheric pressure. Solutions to this problem previously proposed have not proven entirely satisfactory:

The simplest solution is periodically to shut down the ventilation system in order to empty the contents of the storage tank, which is generally done by hand. This is hardly feasible in a large-scale installation intended for continuous production. Also, considerable labour is involved.

Automated installations often use a recovery tank comprising a compartment that can be isolated after receiving some of the powder. This compartment is then progressively emptied, in order to recycle the powder contained in it, by pressurizing it. This type of installation is costly and also costly to maintain.

Finally, it is possible to suck the powder out of the storage tank directly using a suction device, provided that sufficient suction can be generated.

The invention proposes a solution that is extremely easy to implement, of low cost, and applicable to continuous production installations.

SUMMARY OF THE INVENTION

In one aspect the invention consists in a method of recovering powder using processing means adapted to operate at a pressure different to atmospheric pressure by fluidizing powder accumulated in a receptacle communicating with said processing means and creating a pressure head of fluidized powder to compensate the pressure difference imposed by said processing means.

The aforementioned processing means will generally comprise a separator of the type described hereinabove or an analogous device.

In another aspect the invention consists in a powder recovery device comprising processing means adapted to operate at a pressure different to atmospheric pressure, a receptacle for said powder, a substantially vertical column through which said receptacle communicates with said processing means, and means for fluidizing at least the powder in said column.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
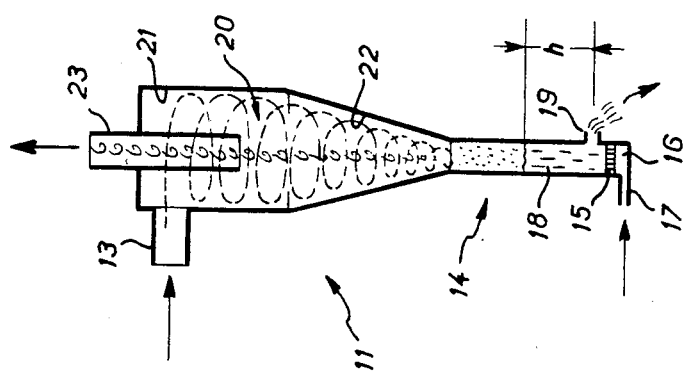
FIG. 1 is a schematic view in elevation of a "cyclone" type separator incorporating improvements in accordance with the invention.

Referring to FIG. 1 in particular, there is shown a "cyclone" type aerodynamic separator 11 for recovering powder suspended in air fed through its inlet pipe 13. This extractor is modified in accordance with the invention, meaning that it is extended in its lower part by a receptacle, in this instance reduced to a vertical column 14 (a simple vertical pipe in the example shown), which receptacle communicates with the separator 11. In accordance with another feature of the invention means are provided for fluidizing the powder accumulated at the bottom of the vertical column 14. In the case of this particular example these means consist of a porous plate 15 fitted into the bottom part of the column 14, the pressurized fluidizing air being fed into a sealed chamber 16 under this plate 15 through a pipe 17. The air pressure is controled in such a way that the porous plate 15 has just sufficient air passed through it to fluidize the powder 18.

The column-shaped receptacle 14 further comprises a lateral opening 19 situated slightly above the porous plate 15, so that the powder contained in it may be recovered. Finally, and in the known manner, the "cyclone" type separator 11 comprises an enclosure 20 consisting of a cylindrical upper section 21 and a frustoconical lower section 22 forming a hopper. The air laden with powder is fed in tangentially through the inlet pipe 13 which discharges into the cylindrical section 21 and leaves after it is cleaned through an axial outlet pipe 23 fixed to the top wall of the separator and extending a certain distance inside it. Operation is as follows:

When the air laden with powder originating from one or more powder-coating cabins (not shown) is fed in at a certain speed through the inlet pipe 13 there is created, in the known manner, a double cyclone (as shown by the helix-shaped lines in FIG. 1), initially descending from the cylindrical section 21 towards the frustoconical section 22 and then ascending in the vicinity of the axis as high as the outlet pipe 23. The air taken off through this is substantially free of powder because the denser powder particles are entrained by centrifugal force and accumulate at the bottom of the column-shaped receptacle 14. When this powder is fluidized by injecting air through the porous plate 15 it behaves in substantially the same way as a liquid, meaning in particular that it can flow freely through the orifice 19 to be recovered in a receiving tank (not shown) in order to be recycled. The reduced pressure in the separator 11 is automatically compensated by a pressure head h (the column height) of the fluidized powder itself, above the opening 19 which is at atmospheric pressure. The level h of fluidized powder is automatically stabilized to match the reduced pressure in the separator so that equilibrium conditions are established. In other words, for a stabilized reduced pressure any additional quantity of powder entering the upper part of the receptacle causes the evacuation of an equivalent quantity of powder through the opening 19. Operations may be conducted in the atmosphere surrounding the separator without any risk of fumes forming.

Figure 2:
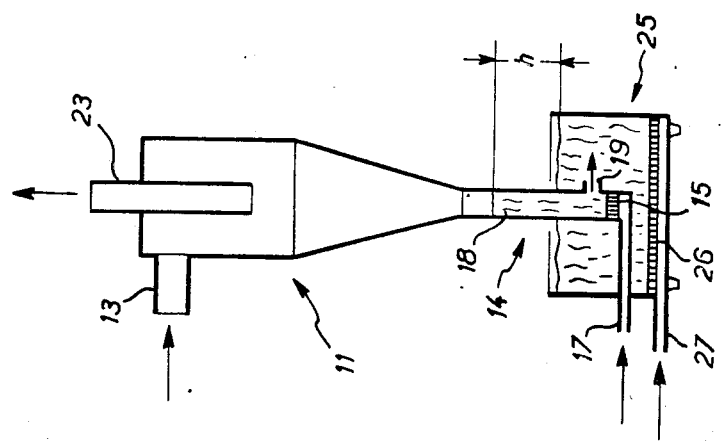
FIG. 2 shows an alternative embodiment of the invention using the same separator as in FIG. 1.

FIG. 2 shows an alternative embodiment in which structural parts identical to those of FIG. 1 carry the same reference numbers and will not be described again. In this alternative embodiment the device as described hereinabove has a part of its column 14 extending downwardly into a storage tank 25 for the fluidized powder. In this specific embodiment the receptacle as defined above thus comprises both the column 14 and the storage tank 25. The opening 19 is located within the storage tank. In the conventional way the means for fluidizing the powder contained in the storage tank 25 may, as previously, consist of a porous plate 26 forming a false bottom beneath which compressed air is injected through a pipe 27. Using this arrangement the powder may be directly taken off from the storage tank 25 to feed the spraying devices. In this case the head of powder h which balances the reduced pressure in the extractor 11 is measured between the level of the powder in the storage tank 25 and the level of the powder in the column 14. Powder entering the column will pass progressively into the storage tank 25, through the opening 19, as in a system of communicating vessels.

Figure 3:
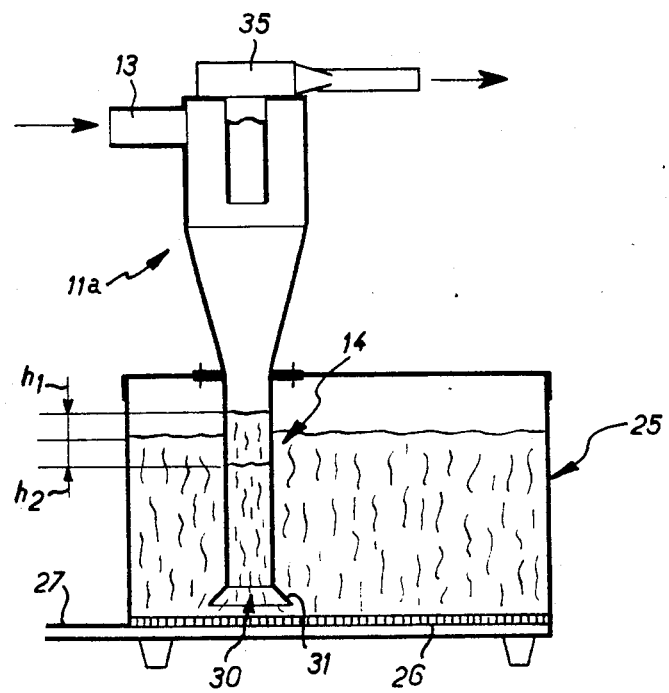
FIG. 3 shows a further embodiment of the invention using an analogous separator or recovery device.

FIG. 3 shows that it is possible to simplify even further the arrangement by eliminating the means for fluidizing the column 14 and using those for fluidizing the storage tank 25. To this end it is sufficient for the column 14 which dips into the storage tank to be substantially completely open at its lower end 30 so that the means for fluidizing the tank also sustain fluidization in the column. It is also advantageous for this end 30 to comprise a divergent flange 31 to promote sustained fluidization. By virtue of this simple arrangement the column 14 recovers more fluidizing air and this surplus air circulates preferentially along the inside wall of the column. In this way it is possible to break down any powder plug that might form at the bottom of the column when the installation is shut down. FIG. 3 shows a recycling separator 11a (of the "cyclone" type but of relatively small size, referred to as a recovery device) whereas the separators 20 in FIGS. 1 and 2 are more specifically air cleaning devices, of relatively large size. However, the structure of the column 14 from the device in FIG. 3 is usable as such for a separator-cleaner as described with reference to FIGS. 1 and 2. With particular reference to the recycling separator 11a, in which the circulating air contains a high concentration of powder, the air is taken off, once the major part of the powder has been removed from it, by means of a suction device 35 or a direct connection to an air extractor pipe. Aspiration is generally applied continuously and as a consequence of this, in the absence of any recycling of the powder, the separator 11a and the column 14 are slightly depressurized, this pressure difference being compensated by a head $h_1$ of fluidized powder in the column. On the other hand, when the device intermittently enters the recycling phase and air laden with powder is injected under pressure (relative to atmospheric pressure) through the pipe 13, the difference in pressure is compensated by a "negative" head $h_2$ relative to the level of powder in the tank. It is remarkable that no supplementary air is injected into the storage tank 25 when recycling is started, which could cause powder to be expelled from the storage tank 25 in the form of "fumes" of considerable nuisance value to personnel.

The type of column described with reference to FIGS. 1 and 2 is, of course, usable in the system of FIG. 3 and vice versa. This also applies to the device of FIG. 4 which differs from that of FIG. 3 only in the nature of the separator. In this device the separator 50 is no longer of the "cyclone" type but merely comprises a box having an air inlet 51 for the air containing the powder and an air outlet 52 through which the substantially clean air is expelled. In this case ciculation of the air is achieved by suction means (not shown) connected to the outlet 52. Between the inlet 51 and the outlet 52 are conventional dry filters 55 mounted on a mobile support 56 so that they can be "shaken" from time to time so that the powder retained on the filters drops into a hopper 57. The column 14 is connected to the bottom part of this hopper.

Figure 4:
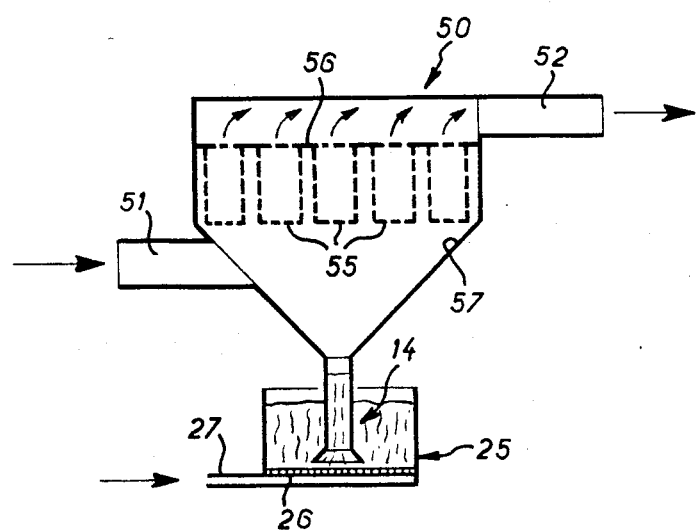
FIG. 4 is a further embodiment using another type of recovery device.

A lateral opening can be provided in the column of the embodiment of FIG. 4 for which powder contained in the column can be recovered. Structure for fluidizing at least the powder in this column can include a porous plate positioned along a lower portion of the column and can include means for passing compressed air through the plate.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. A powder recovery system comprising means for processing powder, a receptacle adapted to receive said powder, a substantially vertical column, said substantially vertical column comprising means for permanently and directly fluidically communicating said powder processing means with said receptacle, and means for fluidizing at least said powder located within said column, wherein said receptacle is at atmospheric pressure and said powder processing means is at a pressure different from atmospheric pressure, wherein powder is maintained within said column.

2. A system in accordance with claim 1, said processing means comprising a cyclone-type separator, said separator being positioned above said column, wherein said column comprises a pipe connected to a lower portion of said separator.

3. A system in accordance with claim 2, wherein said separator has an upper cylindrical portion and a lower frustoconical portion.

4. A system in accordance with claim 3, wherein said upper portion of said separator includes a substantially horizontal inlet comprising means for conducting powder being recovered into said separator.

5. A system in accordance with claim 2, wherein said means for fluidizing said powder in said column comprises a porous plate positioned in a lower portion of said column and means for conducting compressed air through said plate.

6. A system in accordance with claim 2, wherein said column further comprises a substantially horizontally extending outlet for powder fluidized within said column.

7. A system in accordance with claim 6, wherein a porous surface is positioned in said column below said horizontally extending outlet.

8. A system in accordance with claim 1, said processing means comprising a box having an air inlet and an air outlet, at least one filter positioned in said box between said air inlet and said air outlet, and a hopper positioned beneath said filter, said column comprising a pipe which is connected to a bottom portion of said hopper.

9. A system in accordance with claim 8, wherein a plurality of filters are positioned between said air inlet and said air outlet.

10. A system in accordance with claim 8, wherein said pipe has a downwardly and outwardly flared bottom opening.

11. A system in accordance with either of claims 2 or 8, said receptacle comprising a storage tank, said column including a lower portion extending into said storage tank, said storage tank being adapted to receive said powder, said storage tank including means for fluidizing said powder, said column being in fluidic communication with said tank.

12. A system in accordance with claim 11, wherein said lower portion of said column is substantially open, and is positioned directly above said means for fluidizing powder in said storage tank, wherein said means for fluidizing said powder within said storage tank also comprise said means for fluidizing said powder within said column.

13. A system in accordance in accordance with claim 12, wherein said lower portion of said column includes a downwardly diverging flange which comprises means for continually fluidizing powder in said lower portion of said column.

14. A system in accordance with claim 1, wherein said processing means comprises a box having an air inlet along a first side thereof and an air outlet along an upper portion thereof, with a plurality of filters being positioned between said inlet and said outlet.

15. A system in accordance with claim 14, wherein said inlet is horizontally attached to an inclined hopper portion of said box.

16. A system in accordance with claim 15, wherein a lower portion of said column is positioned within said receptacle.

17. A system in accordance with claim 16, wherein the bottom of said column is substantially open and is positioned adjacent a lower portion of said receptacle, wherein a plenum is positioned below a filter along said lower receptacle portion.

18. A method of recovering powder using a processing device which is adapted to operate at a pressure different from atmospheric pressure, said method comprising accumulating powder in a receptacle and maintaining said receptacle in permanent and direct fluidic communication with said processing means via a substantially vertical column, and creating a pressure head of fluidized powder to compensate for the pressure difference between atmospheric pressure and the pressure imposed by said processing means.

19. A method of recovering powder in accordance with claim 18, wherein said processing device comprises a cyclone separator.

20. A method of recovering powder in accordance with claim 19, wherein said processing means comprises a lower inlet, an upper outlet, and a plurality of filters positioned between said inlet and said outlet.

21. A method of recovering powder in accordance with claim 18, wherein said pressure head is created in said column, said column having an upper end attached to a lower end of said processing device.

* * * * *